US006177747B1

(12) United States Patent
Maeda et al.

(10) Patent No.: US 6,177,747 B1

(45) Date of Patent: Jan. 23, 2001

(54) VEHICLE AC GENERATOR AND METHOD OF MANUFACTURING THE SAME

(75) Inventors: Kazutaka Maeda, Toyota; Masaru Sugiyama; Makoto Takahashi, both of Okazaki; Youichi Kamakura, Anjo, all of (JP)

(73) Assignee: DENSO Corporation, Kariya (JP)

(*) Notice: Under 35 U.S.C. 154(b), the term of this patent shall be extended for 0 days.

(21) Appl. No.: 09/429,024

(22) Filed: Oct. 29, 1999

(30) Foreign Application Priority Data

Nov. 2, 1998 (JP) ........................................ 10-312031

(51) Int. Cl.[7] ........................ H02K 3/32; H02K 3/04

(52) U.S. Cl. ................................ 310/179; 310/201

(58) Field of Search ........................ 310/216, 179, 310/180, 184, 201, 58, 254, 257, 270; 29/596–598

(56) References Cited

U.S. PATENT DOCUMENTS 3,860,744 * 1/1975 Schuler ........................ 310/201
5,936,326 * 8/1999 Umeda et al. ..................... 310/179
5,965,965 * 10/1999 Umeda et al. ..................... 310/52

FOREIGN PATENT DOCUMENTS 7-231591 8/1995 (JP) .
98/54823 12/1998 (WO) .

* cited by examiner

*Primary Examiner*—Tran Nguyen
(74) *Attorney, Agent, or Firm*—Pillsbury Madison & Sutro LLP

(57) ABSTRACT

In a stator of a vehicle AC generator, each of stator slots has a circumferential parallel walls and a radial wall opposite a slot-opening. A stator winding has a plurality of radially aligned in-slot portions fitted in each of the slots at the circumferential sides thereof to form a central gap at the radially central portion of the in-slot portions. The central gap provides each of the in-slot portions with spring-back force against the slot-opening. Thus, slot-openings are hermetically closed, and the teeth are prevented from being vibrated by stator winding.

3 Claims, 7 Drawing Sheets

VEHICLE AC GENERATOR AND METHOD OF MANUFACTURING THE SAME

CROSS REFERENCE TO RELATED APPLICATION

The present application is based on and claims priority from Japanese Patent Application Hei 10-312031 filed on Nov. 2, 1998, the contents of which are incorporated herein by reference.

BACKGROUND OF THE INVENTION

1. Field of the Invention

The present invention relates to an ac generator for a vehicle such as a passenger car or a truck.

2. Description of the Related Art

Recently, in order to reduce vehicle outside and inside noises, engine noise has been reduced. Accordingly, magnetic noise caused by ac generators has become relatively harsh. As vehicle electric loads have increased, the output power of ac generators has also increased, resulting in an increase of the magnetic noise.

In the conventional ac generator, round magnetic wires are used for a stator winding, which is installed into a cylindrical stator core. JP-A-7-231591 discloses a stator having a stator winding disposed in slots and retained by wedges.

However, in the stator core of such a conventional ac generator, teeth are not supported in the circumferential direction by other members. Therefore, the teeth may vibrate in the circumferential direction due to vibration of the stator winding while the ac generator is driven to generate electric power.

Although the above stated stator core has wedges for retaining the stator winding, it is preferable to omit the wedges to reduce production cost. However, if the wedges are omitted, it is difficult to prevent salt water or muddy water from entering the slots. This may deteriorate the insulation of the stator winding and slots.

SUMMARY OF THE INVENTION

An object of the invention is to provide a low-noise and corrosion resistant ac generator.

According to an embodiment of the invention, a stator winding having a plurality of radially aligned in-slot portions disposed in each slot to form a gap at the radially central portion thereof, and at least one of the in-slot portions is or are disposed at the radially inner side of each slot. Therefore, each slot is effectively closed by the in-slot portions and teeth between the slots are supported by the in-slot portions from opposite circumferential sides.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
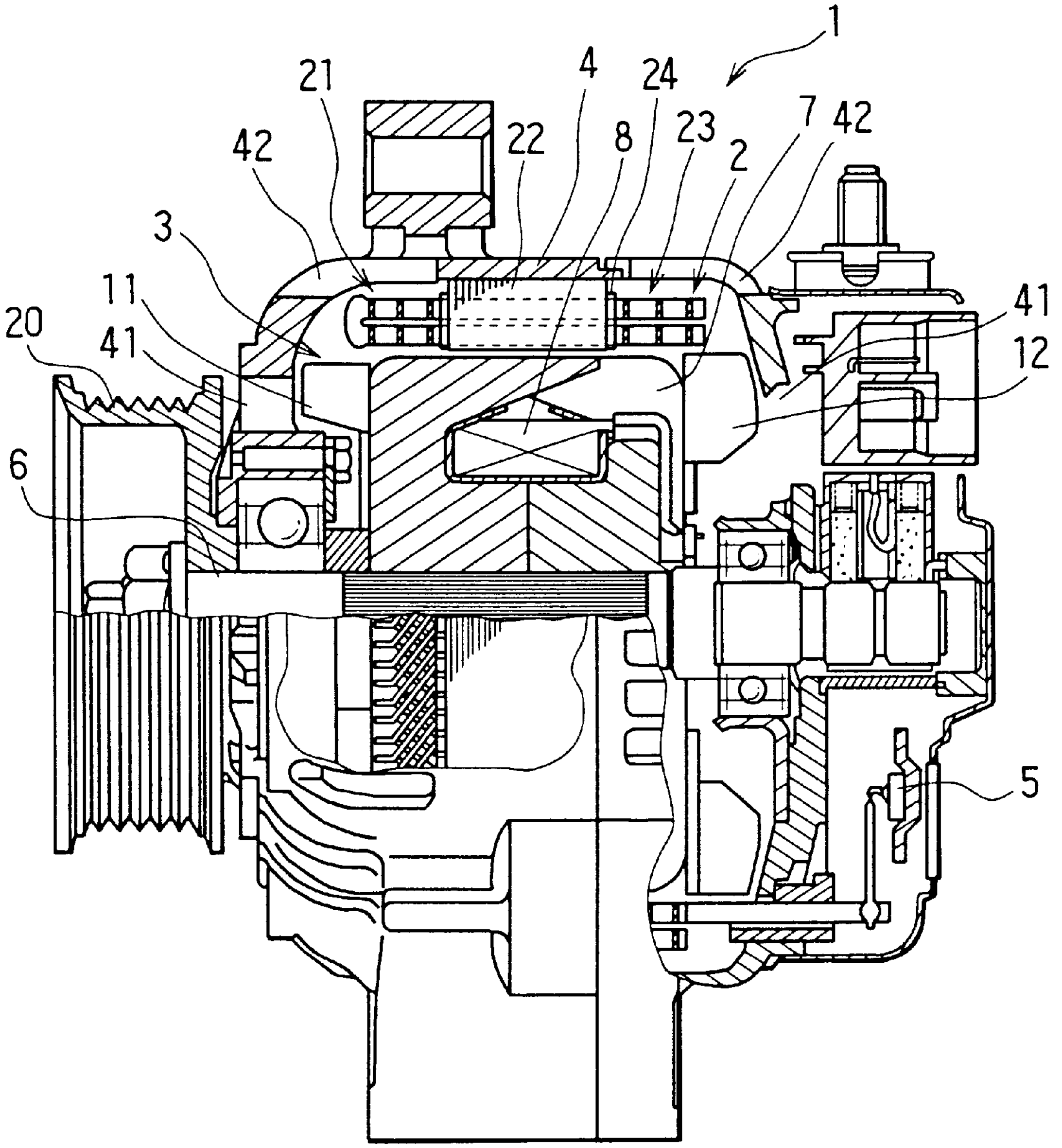
FIG. 1 is a cross-sectional side view of an ac generator according to a preferred embodiment of the invention.

In FIG. 1, ac generator 1 includes, inter alia, stator 2, rotor 3, frame 4, rectifier unit 5.

Stator 2 includes stator core 22, a plurality of sets of conductor segments 23 and insulators 24.

Rotor 3 includes shaft 6, a pair of pole cores 7 fixed by shaft 6 each of which has six claw poles, and a cylindrical field coil 8 which is enclosed by the pair of pole cores 7. Mixed-flow-type cooling fan 11 is welded to the front surface of the pair of pole cores 7 and centrifugal cooling fan 12 is welded to the rear surface of the pair of pole core 7.

Frame 4 accommodates stator 2 and rotor 3 and supports rotor 3 to rotate about shaft 6. Frame 4 also supports stator 2 around the pair of pole cores 7 at a predetermined space from the outer periphery of the pair of pole cores 7. Frame 4 has a plurality of air discharge windows 42 at portions of frame 4 opposite portions of the stator winding extending from the axial end thereof and a plurality of air intake windows 41 at central portions of frame 4.

When ac generator 1 is driven by an engine (not shown) through a belt and pulley 20, rotor 3 rotates in a prescribed direction. When field coil 8 is energized from outside while rotor 3 is rotating, the claw poles are excited so that three-phase ac power is generated in the stator winding. Rectifier unit 5 converts the ac power to dc power.

Figure 2:
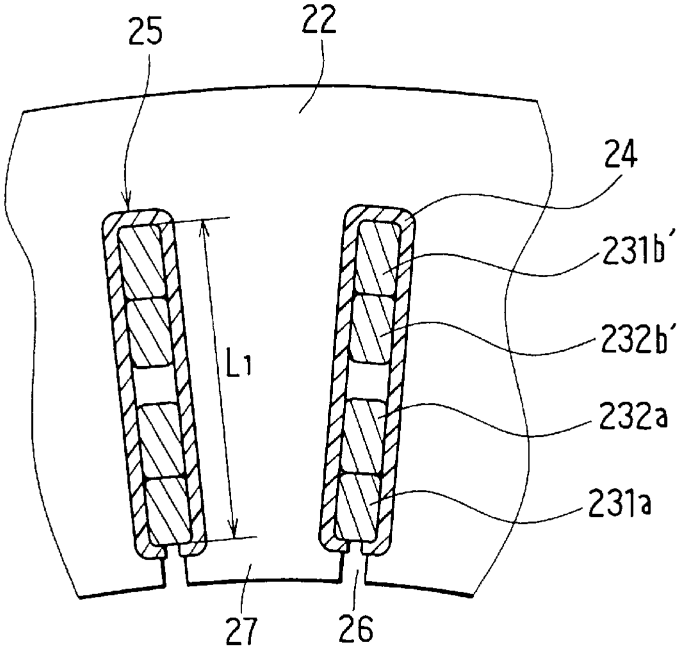
FIG. 2 is a fragmentary cross-sectional plan view of a stator according to the preferred embodiment.

As shown in FIG. 2, stator core 22 has a plurality of generally rectangular slots 25 formed circumferentially at equal intervals to correspond to the number of magnetic poles and T-shaped teeth 27 formed between slots 25. Thus, each slot 25 has a bottle-neck slot-opening 26, formed parallel to the circumferential walls and radially outer wall.

The stator winding disposed in slots 25 is composed of a plurality of sets of conductor segments 23. Four (or even number of) in-slot portions 231*a*, 232*a*, 232*b*′, 231*b*′ of conductor segments 23 are disposed in each slot 25.

As shown in FIG. 2, four in-slot portions in each slot 25 is aligned in the radial direction of stator core 22 in the following four layers: innermost layer, inner middle layer, outer middle layer, and outermost layer. In particular, in-slot portion 231*a* in the innermost layer and in-slot portion 232*a* in the inner middle layer are disposed radially inner portion in a slot and in-slot portion 232*b* in the outer middle layer and in-slot portion 231*b* in the outermost layer are disposed radially outer portion in the same slot, so that a central gap is formed between in-slot portion 232*a* and in-slot portion 232*b*. Each in-slot portion of conductor segments 23 has a circumferential width that is an insulator thickness less than circumferential width of slot 25 so that they are fitted into slots 25.

In-slot portion 231*a* of large U-shaped conductor segment 231 in the innermost layer of one slot 25 is integrally connected through turn portion 231*c* with in-slot portion 231*b* in the outermost layer of another slot 25 spaced apart in the clockwise direction by one pole-pitch therefrom. In other words, large U-shaped conductor segment 231 has a pair of forked in-slot portions 231*a* and 231*b*. In the same manner, in-slot portion 232*a* of small U-shaped conductor segment 232 in the inner middle layer of one slot is integrally connected through turn portion 232*c* with in-slot portion 232*b* in the outer middle layer of another slot 25 spaced apart in the clockwise direction by one pole-pitch therefrom. In other words, small U-shaped conductor segment 232 has a pair of forked in-slot portions 232*a* and 232*b*.

Therefore, turn portion 231*c* of large segment 231 encloses turn portion 232*c* of small segment 232 at one end of stator core 22. Thus, the turn portion of each of the large U-shaped segments 231 encloses the turn portion of one of the small U-shaped segments 232 at the same end of stator core 22, so that inner coil ends are formed by the small U-shaped segments 232 and outer coil ends are formed by the large U-shaped segments 231.

On the other hand, in-slot portion 232*a* of small U-shaped segment 232 in the inner middle layer of one slot 25 is connected by welding at segment ends 232*d* and 231*d'* disposed at the opposite end of stator core 22 to an in-slot portion of another large segment in the innermost layer of another slot 25 one pole-pitch spaced apart in the clockwise direction therefrom. In the same manner, in-slot portion 231*b* of large U-shaped segment 231 in the outermost layer of one slot 25 is connected by welding at segment ends 231*e* disposed at the opposite end of stator core 22 to an in-slot portion of another small segment in the outer middle layer of another slot 25 one pole-pitch spaced apart in the clockwise direction therefrom.

Accordingly, the joint portions of the segment ends connecting the in-slot portions in the inner middle layer and the in-slot portions in the innermost layer form an inner ring at the opposite end of stator core 22. The joint portions of the segment ends connecting the in-slot portions in the outer most layer and the in-slot portions in the outer middle layer also form an outer ring at the opposite end of stator core 22. The inner and outer rings are radially spaced apart from each other.

Figure 3:
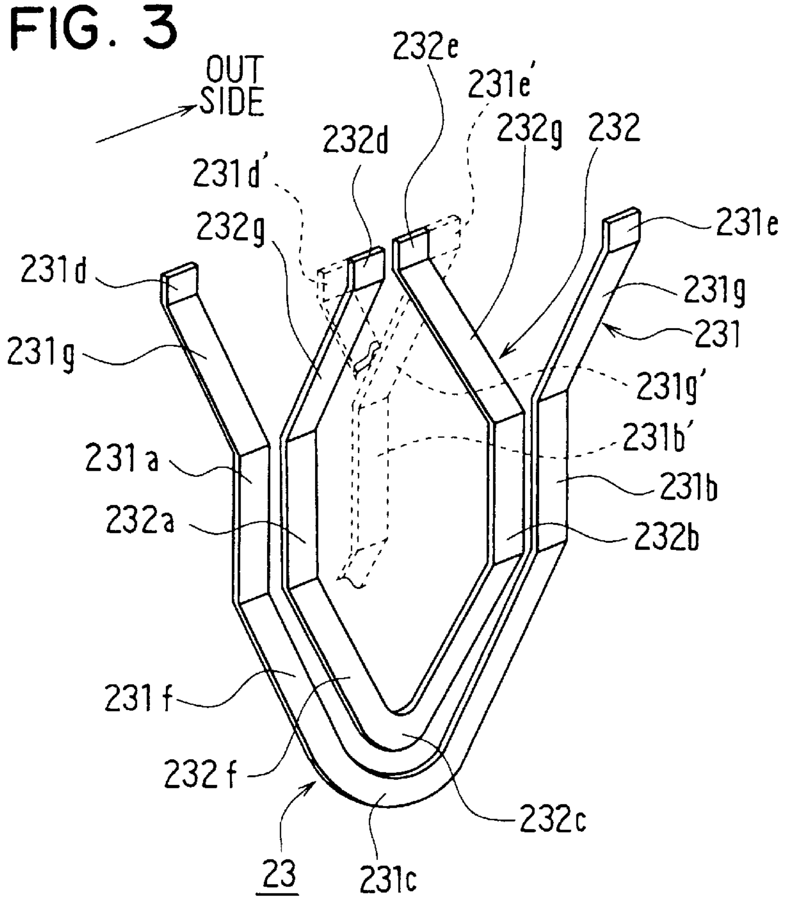
FIG. 3 is a perspective view of a set of conductor segments of the stator shown in FIG. 2.

As shown in FIG. 3, large segment 231 has axially inclined portions 231*f* and 231*g*, and small segment 232 has axially inclined portion 232*f* and 232*g*. These inclined portions form coil ends having cooling air passages therebetween.

The above described structures are applied to all the sets of conductor segments 23. All the segment ends such as 231*d*, 231*d'*, 232*e*, 231*e'*, and 231*e* are welded at the opposite end of stator core 22 by an ultrasonic welder or an arc welder or are soldered. The joint portions are covered by insulation coatings. Bridge members can be provided to bridge the respective joint portions to increase vibration resistance. The joint portions are preferably coated with thicker coatings than other portions.

Figure 4:
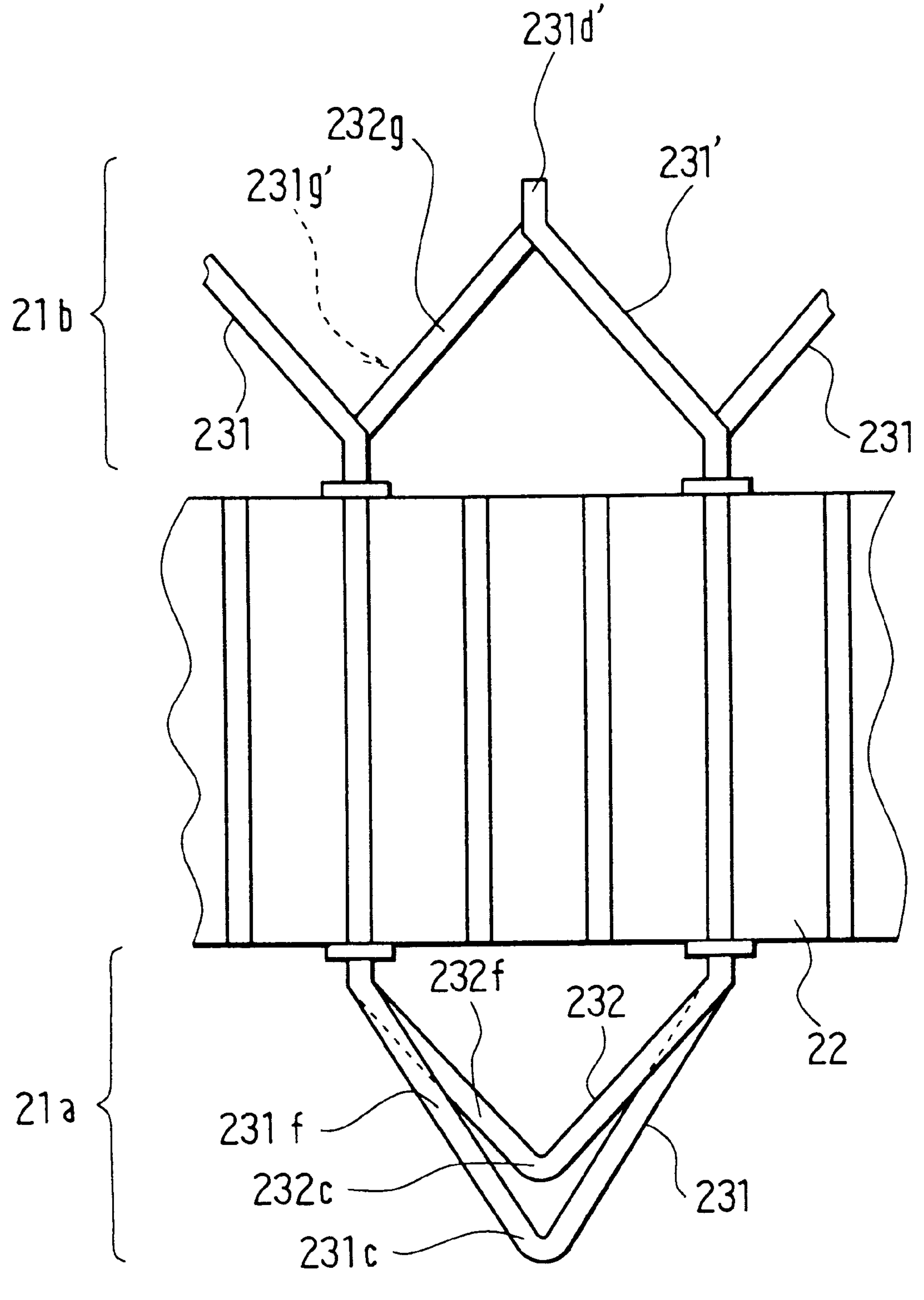
FIG. 4 is a schematic diagram illustrating a main portion of the stator viewed from inside the stator according to the preferred embodiment.

As shown in FIG. 4, first coil end group 21*a* corresponding to turn portions 231*c* and 232*c* comprises an inner coil end and an outer coil end as a coil-end element. On the other hand second coil end group 21*b* at the opposite end of stator sore 22 comprises adjoining coil ends as a coil-end element. A plurality of the coil-end elements are regularly disposed to form gaps therebetween. The coil-end elements are disposed circumferentially at equal intervals.

Both coil-end groups 21*a* and 21*b* have air passages among their coil-end elements. These air passages are circumferentially distributed evenly in the ring-shaped coil-end groups.

Inside surfaces of coil-end groups 21*a* and 21*b* have a inside diameter a little larger than the inside diameter of stator core 22. Both coil-end groups have the same height along the circumference thereof.

Figure 7:
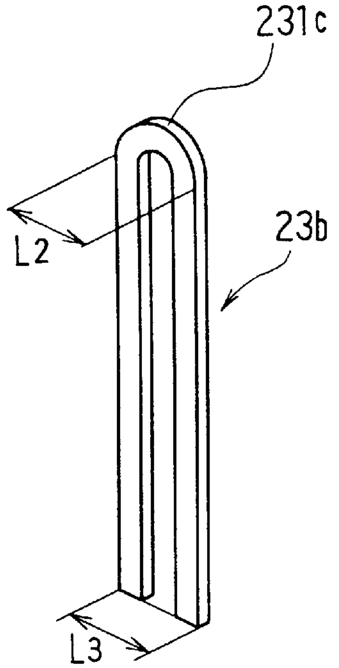
FIG. 7 is a perspective view illustrating a U-shaped conductor segment in a step before bending.
Figure 8:
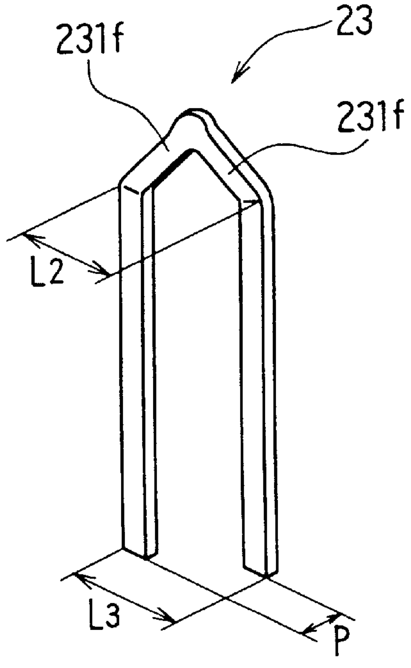
FIG. 8 is a perspective view illustrating a U-shaped conductor segment in a step before it is inserted into a slot of the stator.

A method of manufacturing the stator winding is described with reference to FIGS. 6, 7 and 8.

Figure 6:
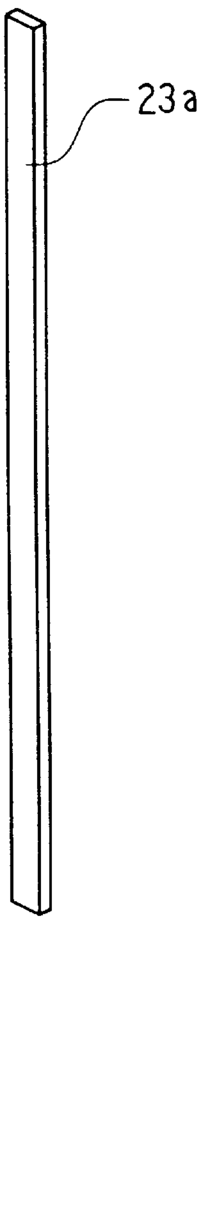
FIG. 6 is a perspective view illustrating a conductor segment in a step before it is formed into a U-shaped conductor segment.

A straight conductor segment 23*a* for large U-shaped segment 231 is formed as shown in FIG. 6. This is bent at the middle thereof to form a U-shaped segment having turn portion 231*c* as shown in FIG. 7. This U-shaped segment has a turn-portion with radial width L2 and a segment-end with radial width L3. Thereafter, turn portion 231*c* is held and twisted to form inclined portion 231*f*. Thus, second-stage U-shaped segment 23*b* shown in FIG. 8 is formed.

In this stage, both width L2 and width L3 are wider than the depth L1 of slot 25. Two straight portions of the segment are circumferentially spaced apart by a distance P that corresponds to one pole-pitch. Depth L1 corresponds to, as shown in FIG. 2, the segment and insulator accommodation space of slot 25. In FIG. 8, L1 is smaller than L2, and L2 is equal to L3. However, L1 can be smaller than L3 as far as L1 is smaller than L2. Distance P can be a little wider than the one pole-pitch.

Small U-shaped segments 232 are manufactured in substantially the same manner as described above.

Each one of large U-shaped segments 231 and small U-shaped segments 232 are put together into a set of conductor segments 23 with turn portions 231*c*, 232*c* thereof being aligned. Then, the set of conductor segments 23 is inserted into a pair of slots 25 one pole-pitch spaced apart from each other.

Because both turn portion's radial width L2 and segment end's radial width L3 are larger than slot's depth L1, the set of conductor segments 23 is deformed or compressed to provide spring-back force. Thus, the set of segments 23 presses at the in-slot portions thereof against the radially outside wall and radially inside wall of the slots 25 as shown in FIG. 2. Since each in-slot portion of conductor segments 23 has a circumferential width to be fitted into slots 25, in-slot portion 231*a* in the innermost layer and in-slot portion 232*a* in the inner middle layer not only hermetically close slot-opening 26 but also press each of teeth 27 from both circumferential sides thereof. Thus, salt water or muddy water is effectively shut out from slot-opening 26, and teeth 27 are not vibrated by the stator winding even when it generates output power under severe vehicle conditions.

Moreover, the central gap formed between in-slot portion 232*a* and in-slot portion 232*b* provides a convenient space for welding the segment ends by a welder. The central gap can be formed between in-slot portion 231*a* and in-slot portion 232*a*, or between in-slot portion 232*b* and in-slot portion 231*b*.

Figure 5:
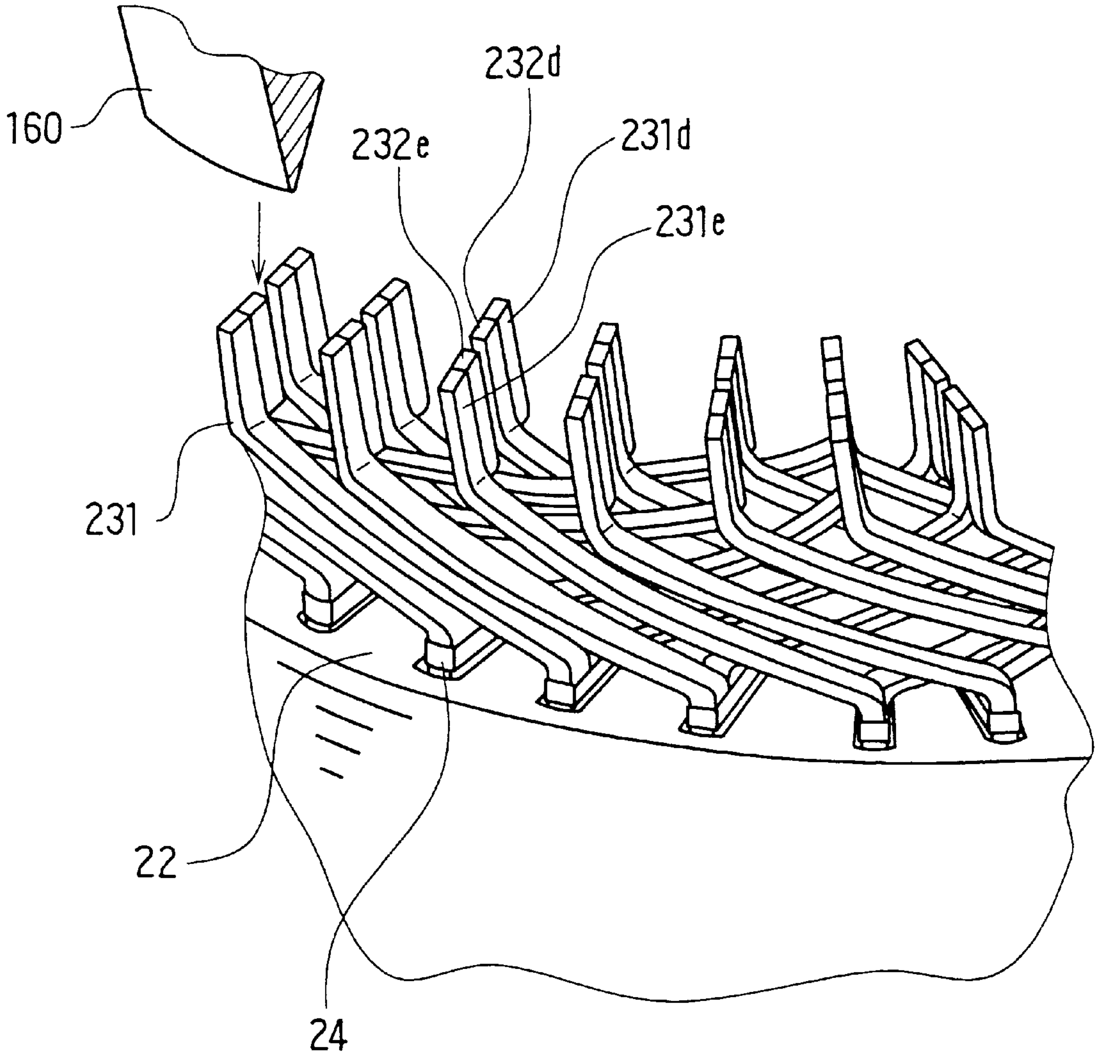
FIG. 5 is a fragmentary perspective view of a main portion of the stator according to the preferred embodiment.
Figure 9:
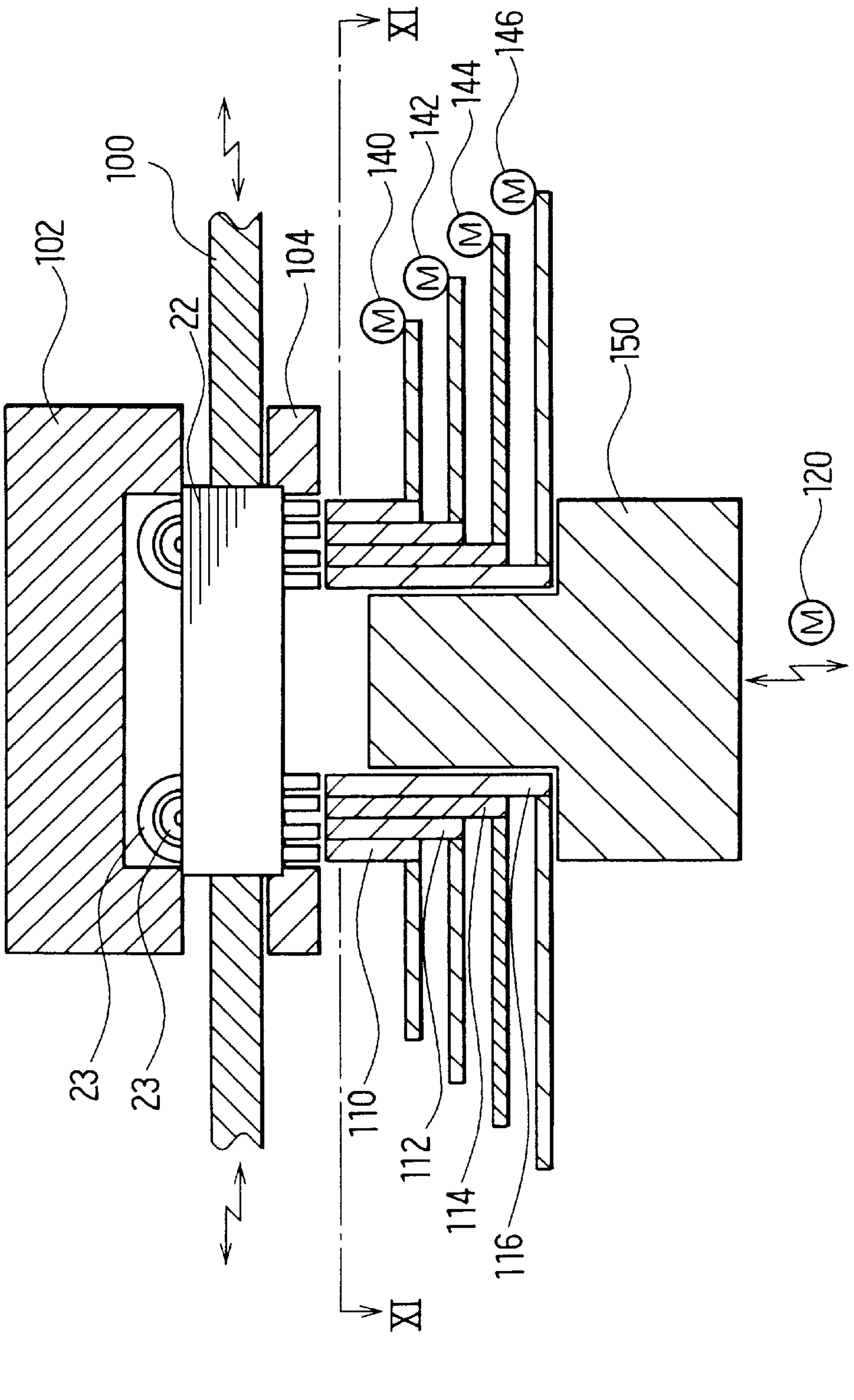
FIG. 9 is a schematic diagram showing a segment-forming apparatus.
Figure 10:
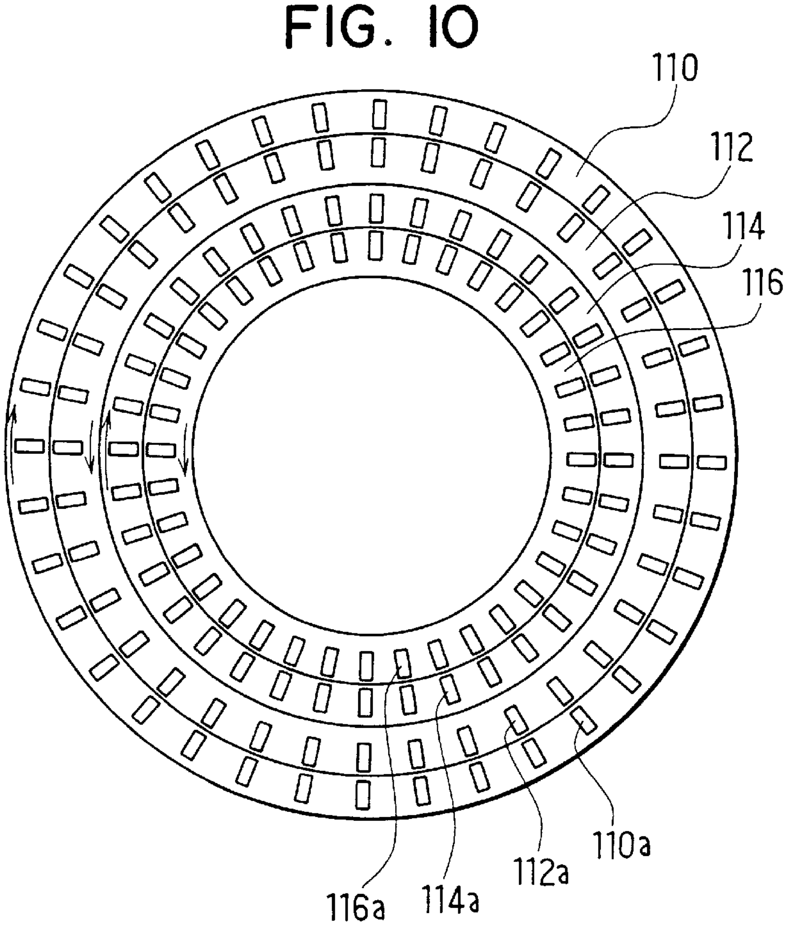
FIG. 10 is a cross-sectional plan view of the apparatus cut along line XI—XI in FIG. 10.

In FIGS. 9 and 10, after all the sets of large U-shaped segments 231 and small U-shaped segments 232 are inserted into slots 25 of stator core 22, stator core 22 is clamped by clamp 100 at the outer periphery thereof, pressed in the axial direction between work pressor 102 and work support 104 so that all turn portions 231*c*, 232*c* can be retained unmoved. For example, turn portions 231*c* and 232*c* are retained in the axial direction by work pressor 102 at the lower surface thereof. Then, the straight portions extending from the outermost layer and the inner middle layer of slots 25 are twisted in one circumferential direction and straight portions extending from the inner most layer and the outer middle layer of slots 25 are twisted in the other circumferential direction as shown in FIG. 5.

As shown in FIG. 10, four coaxial-ring-twisters 110, 112, 114, 116 have respectively a plurality of rectangular apertures 110*a*, 112*a*, 114*a*, 116*a* formed to respectively correspond to the in-slot portions of conductor segments 23 disposed in the outermost layer, outer middle layer, inner middle layer and innermost layer of slots 25.

As shown in FIG. 9, twisters 110, 112, 114, and 116 are lifted by up-down motor 120 so that the segment ends of the conductor segments 23 extending from the stator core are respectively inserted into rectangular apertures 110*a*, 112*a*, 114*a* and 116*a*.

As shown in FIG. 10, outermost twister 110 and inner middle twister 114 are respectively turned clockwise by motors 140 and 144, and outer middle twister 112 and innermost twister 116 are respectively turned counterclockwise by motors 142 and 146. Because the segment ends inserted in the twister's apertures move upward as the straight portions are twisted, up-down motor 120 drives up-down shaft 150 upward to hold the segments end in the twister's apertures. The segment ends inserted in the apertures remain straight as segment ends 231*d*, 232*d*, 231*e*, and 232*e*.

As shown in FIG. 5, wedge-like tool 160 is inserted between segment ends 232*d* and 232*e* to bend segment end 231*d* corresponding to in-slot portion 231*a* in the innermost layer and segment end 232*d* corresponding to in-slot portion 232*a* in the inner middle layer incline radially inward, and bend segment end 231*e* corresponding to in-slot portion 231*b* in the outermost layer and segment end 232*e* corresponding to in-slot portion 232*b* in the outer middle layer incline radially outward by a wedge-like tool 160. This step is applied to all the segment ends to widening segment ends of U-shaped conductor segments and to form radially aligned inner and outer segment ends. Thus, in-slot portion 231*a* in the innermost layer and in-slot portion 232*a* in the inner-middle layer are pressed radially inward.

Thereafter, inner segment ends 231*d* and 232*d* are welded together and outer segment ends 231*e* and 232*e* are welded together, by a TIG welder, so that all the segment ends are level with one another. The bending step by tool 160 can be carried out after all the segment ends are welded.

Subsequently, stator 2 is carried to an impregnation tank with the segment ends down to dip the segment ends in insulation liquid. Thereafter, stator 2 is dried to form insulation layers on the segment ends.

This invention can be applied to a stator having a pair of in-slot portions of conductor segments in each slot with the central gap being therebetween.

Figure 11:
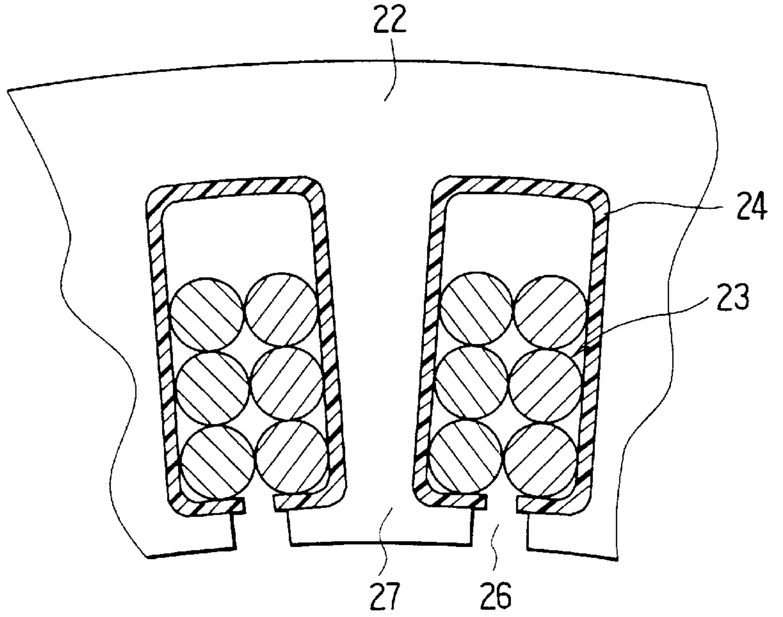
FIG. 11 is a fragmentary enlarged cross-sectional view of a stator according to another embodiment of the invention.

A stator winding formed of round magnet wires is shown in FIG. 11 as another embodiment of the invention. At least, a portion (or all) of wires inserted in the slots of stator core is pressed radially inward to close the slot-openings and circumferential outward to support the each of teeth 27 from opposite sides thereof. This step can be carried out when all the stator winding is wound up and inserted into the slots.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of a vehicle AC generator comprising:

a stator core having a plurality of T-shaped teeth, said teeth providing slots and bottle-neck-shape slot-openings between said teeth, each of said slots having circumferential parallel walls and a radial wall opposite said slot-opening; and a stator winding having a plurality of radially aligned in-slot portions fitted in each of said slots at the circumferential sides thereof to form a gap at the radially central portion thereof, said gap providing each of said in-slot portions with spring-back force against each of said slot-openings.

2. The stator as claimed in claim 1, wherein said stator winding comprises a plurality of U-shaped conductors welded to one another, and each said U-shaped conductor has one of said in-slot portions disposed in a slot layer radially outside said gap and another of said in-slot portions disposed in a slot layer radially inside said gap.

3. The stator as claimed in claim 1, wherein said stator winding comprises a plurality pairs of large and small U-shaped conductors welded to one another, and each said large U-shaped conductor encloses said small U-shaped conductor segment, and each of said large and small conductors has one of said in-slot portions disposed in a slot layer radially outside said gap and another of said in-slot portions disposed in a slot layer radially inside said gap.

* * * * *